G. E. MARQUETTE.
STEERING GEAR.
APPLICATION FILED JAN. 19, 1910.
988,121.
Patented Mar. 28, 1911.
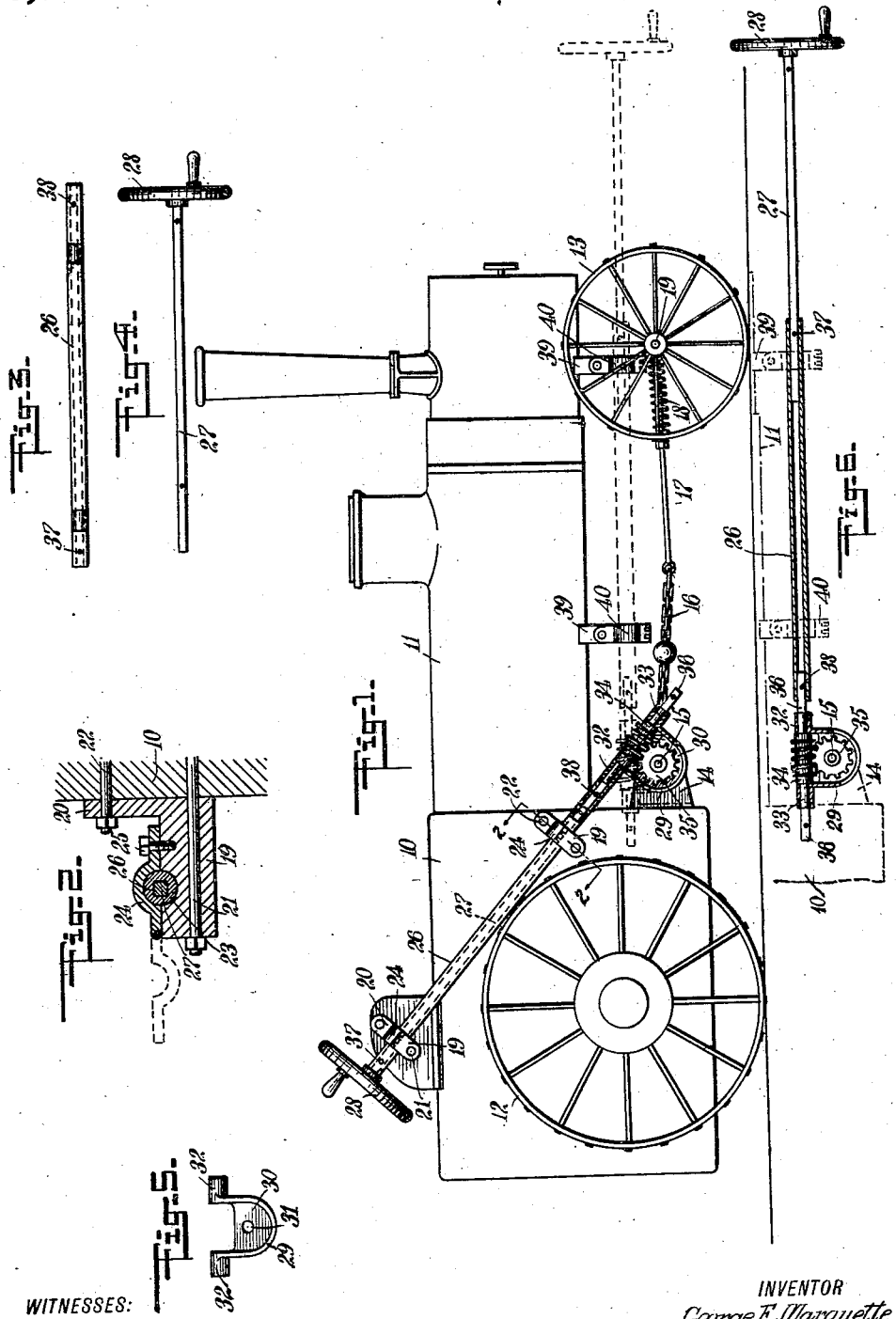
WITNESSES:
INVENTOR
George E. Marquette
BY
ATTORNEYS

UNITED STATES PATENT OFFICE.

GEORGE E. MARQUETTE, OF LARCHWOOD, IOWA.

STEERING-GEAR.

988,121.  Specification of Letters Patent.  Patented Mar. 28, 1911.

Application filed January 19, 1910. Serial No. 538,805.

*To all whom it may concern:*

Be it known that I, GEORGE E. MARQUETTE, a citizen of the United States, and a resident of Larchwood, in the county of Lyon and State of Iowa, have invented a new and Improved Steering-Gear, of which the following is a full, clear, and exact description.

This invention relates to steering gears for traction engines and similar machines, and has reference more particularly to a steering gear which is mounted upon a traction engine so that it can be arranged in a plurality of positions to permit the engine to be directed from different points.

The object of the invention is to provide a simple and efficient steering gear, which can be used for steering traction engines and similar motor-driven vehicles or draft devices which are adapted to travel under their own power; which can be mounted upon different parts of the engine, so that the driver thereof can manipulate the steering gear at different points either upon the engine or while walking adjacent to it; which can be simply and expeditiously changed from one position to another, and which is extensible to adapt it to operate successfully in different positions.

The invention consists in the construction and operation of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of a traction engine having an embodiment of my invention applied thereto; Fig. 2 is an enlarged transverse section on the line 2—2 of Fig. 1; Fig. 3 is a side elevation showing a part of the steering gear; Fig. 4 is a similar view showing another part of the steering gear, including the hand-wheel by means of which the gear is manipulated; Fig. 5 is a side elevation of a detail forming a bearing for the shaft of the gear; and Fig. 6 is a longitudinal section of the gear, showing the same applied to the traction engine in a different position.

Before proceeding to a more detailed explanation of my invention, it should be clearly understood that it is sometimes advisable for a driver of a traction engine to be able to steer the machine while not upon the same, for example when walking along the ground in front of the engine. As an instance of the desirability of a condition of affairs such as outlined above, it may be stated that if a heavy traction engine crosses a bridge of uncertain strength, and breaks through the bridge, the driver is almost certain to be seriously injured or killed, if he is riding on the engine at the time of the accident. By being able to walk adjacent to the engine while steering it in crossing the bridge, he at least, has a chance to escape. For this purpose I provide a steering gear which can be so arranged that the operator can manipulate it while in his customary position upon the engine, and which further can be so arranged that the operator can manipulate it while walking in front of the engine, which naturally travels at a slow rate of speed.

Certain of the details of construction form no part of the invention, and can be varied in accordance with special conditions and individual preference, without departing from the underlying spirit of the invention.

Referring more particularly to the drawings, I have shown a traction engine of the customary form, having a body 10, including a boiler 11, and supported upon the main or driving wheels 12 and the front or steering wheels 13, the latter being mounted in the usual manner, to turn freely. Journal brackets 14 are mounted upon the under part of the engine body and carry a transverse shaft 15 connected by means of chains 16 and links 17, with the front or steering axle 19. The shaft 15 serves to operate the steering wheels in the usual manner. The parts 16 and 17 may be of any suitable form. For example, the links 17 include spring devices 18 for absorbing shocks.

Brackets 19 having laterally disposed parts 20, are mounted by means of bolts 21 and 22, upon the machine body, and have bearing recesses 23. Hinged bearing members 24 are mounted upon the brackets 19, above the bearing recesses 23, and are adapted to be held in place by means of set screws 25. A tubular steering shaft 26, is journaled in the bearings formed by the brackets and the members 24, and has slidably arranged therein a rod 27. The latter has secured thereto at one end, the hand-wheel 28 by means of which it can be manipulated. It, like the bore of the shaft 26, is of angular cross section, so that when the steering wheel is turned, the shaft is constrained to rotate with the rod 27. A yoke 29, having a web 30 provided with an opening 31, is mounted upon the shaft 15 which passes through the opening 31. The yoke has hubs 32 forming alined bearings in which is journaled a spindle 33 having formed thereon a worm 34. The worm is in mesh with a gear 35 carried by the shaft 15. The spindle has ends 36 of annular section, each adapted to be received in the extremity of the tubular shaft 26, so that, as the hand-wheel is turned, the spindle is likewise turned, and serves to operate the shaft 15 and the steering wheels, locking pins 37 and 38 serving to secure the shaft 26 to the rod 27, and the shaft to the other end 36 of the spindle 33.

The machine has brackets 39 similar to the brackets 19 and likewise provided with bearing members 40, with which they form bearings adapted to have the shaft 26 journaled therein, as is indicated in dotted outline in Fig. 1. When in this position, the shaft 26 is secured to the forward end of the spindle 33, the yoke being swung about until the spindle is substantially horizontal. The rod is first drawn out from the shaft, to extend the length of the shaft, as is indicated in dotted outline, and to position the hand-wheel at the front of the machine, so that the operator can manipulate it while walking ahead of the engine.

Having thus described my invention, I claim as new, and desire to secure by Letters Patent:

1. In a traction engine having steering road wheels, a shaft controlling said road wheels, a spindle for operating said shaft and mounted to swing bodily with reference thereto, a removable steering shaft adapted to be operatively connected with said spindle at either end thereof, means for manually controlling said steering shaft, and brackets mounted upon said engine at different points thereof, and each adapted to have said steering shaft removably journaled thereon.

2. In a traction engine having steering road wheels, a shaft controlling said road wheels, a yoke movably mounted upon said shaft and having a spindle for operating said shaft, a steering shaft having an end formed to be operatively connected with either of the ends of said spindle, means for manually operating said steering shaft, and brackets mounted upon the engine and each adapted to have said steering shaft removably journaled therein.

3. In a traction engine having steering road wheels, a shaft controlling said road wheels, a yoke movably mounted upon said shaft and having a spindle for operating said shaft, said spindle having ends of angular cross section, a hollow shaft having a bore of angular cross section adapted to receive each of said ends, a rod slidably mounted in said bore and having a hand-wheel, and brackets mounted upon the engine and each adapted to have said hollow shaft removably journaled therein, said second shaft and said rod having means whereby they can be secured against movement longitudinally of one another.

In testimony whereof I have signed my name to this specification in the presence of two subscribing witnesses.

GEORGE E. MARQUETTE.

Witnesses:
ARTHUR J. REINKE,
O. C. SCHUMANN.

---

Copies of this patent may be obtained for five cents each, by addressing the "Commissioner of Patents, Washington, D. C."